(12) United States Patent
Harris et al.

(10) Patent No.: US 8,932,983 B1
(45) Date of Patent: Jan. 13, 2015

(54) CHITOSAN BASED ADSORBENT

(75) Inventors: James M Harris, Menlo Park, CA (US); Sharad Hajela, San Carlos, CA (US)

(73) Assignee: Crystal Clear Technologies, Inc., Portland, OR (US)

( * ) Notice: Subject to any disclaimer, the term of this patent is extended or adjusted under 35 U.S.C. 154(b) by 310 days.

(21) Appl. No.: 12/714,423

(22) Filed: Feb. 26, 2010

Related U.S. Application Data

(60) Provisional application No. 61/208,885, filed on Feb. 27, 2009.

(51) Int. Cl.
　　*B01J 20/24*　　(2006.01)
　　*B01J 20/22*　　(2006.01)
　　*B01J 20/06*　　(2006.01)
　　*B01J 20/08*　　(2006.01)
　　*B01J 20/10*　　(2006.01)
　　*B01J 20/18*　　(2006.01)

(52) U.S. Cl.
　　USPC ........... 502/404; 502/400; 502/401; 502/405; 502/415

(58) Field of Classification Search
　　USPC ......................... 502/400, 401, 404
　　See application file for complete search history.

(56) References Cited

U.S. PATENT DOCUMENTS

| | | | |
|---|---|---|---|
| 4,879,340 A | 11/1989 | Moriguchi | |
| 4,882,066 A | 11/1989 | Portier | |
| 5,578,217 A | 11/1996 | Unger | |
| 5,900,479 A | 5/1999 | Glasser | |
| 6,786,336 B2 | 9/2004 | Boddu | |
| 7,309,437 B2 | 12/2007 | Cuero | |
| 7,354,600 B1 | 4/2008 | Bernkop-Schnurch | |
| 7,365,190 B2 | 4/2008 | Couture | |
| 7,491,669 B2 | 2/2009 | Johnson | |
| 2006/0000783 A1 | 1/2006 | Branning | |
| 2006/0223965 A1 | 10/2006 | Trifu | |
| 2007/0281904 A1* | 12/2007 | Baker et al. | 514/55 |
| 2008/0149566 A1 | 6/2008 | Messersmith | |
| 2008/0264857 A1 | 10/2008 | Sieczkowski | |
| 2008/0292706 A1 | 11/2008 | King | |

OTHER PUBLICATIONS

Tsai et al., "Preparation and Cell Compatibility Evaluation of Chitosan/Collagen Composite Scaffolds Using Amino Acids as Crosslinking Bridges." J. Applied Polymer Sci., vol. 105, 1774-1785 (2007). Published online on Apr. 26, 2007.*

WebQC.org Chemical Portal, "Amino Acids: Formula, Molecular Weight." (c) 2013 WebQC.org (no month). Viewed Jul. 26, 2013 at http://www.webqc.org/aminoacids.php.*

Abdel-Magid, Ahmed F., et al.; "Reductive Amination of Aldehydes and Ketones with Sodium Triacetoxyborohydride. Studies on Direct and Indirect Reductive Amination Procedures"; J. Org. Chem. 1996, 61, 3849.

Bernkop-Schnurch, Andreas, et al.; "Polymers with Thiol Groups: A new generation of Mucoadhesive Polymers?", Pharmaceutical Research, vol. 16, No. 6, 1999.

(Continued)

*Primary Examiner* — Stanley Silverman
*Assistant Examiner* — Daniel Berns
(74) *Attorney, Agent, or Firm* — Fernandez & Associates, LLP

(57) ABSTRACT

An adsorbent for removing compounds from a fluid comprising chitosan and one or more additional materials to enable selectivity of compounds removed. A chitosan based adsorbent is functionalized and cross linked to a predetermined degree to enhance its capacity and selectivity for various molecules and/or ions.

12 Claims, 6 Drawing Sheets

Metal Removal with Chitosan media

(56) References Cited

OTHER PUBLICATIONS

Boddu, Veera M., et al.; "Removal of Hexavalent Chromium from Wastwater using a new composite chitosan biosorbent"; Environ. Sci. Technol. 2003, 37, 4449.

Boddu, Veera M., et al.; "Removal of Arsenic(III) and Arsenic(V) from aqueous medium using a chitosan-caoted biosorbent"; Water Research 42 (2008) 633.

Carter, Timothy G., et al.; "New functional materials for heavy metal sorption: "Supramolecular" attachment of thiols to mesoporous silica substrates"; Chem. Commun., 2008, 1.

Crini, Gregorio; "Recent developments in polysaccharide-based materials used as adsorbents in wastewater treatment"; Prog. Polymer Sci. 30 (2005) 38.

Du, Jian, et al.; "PEGylation of chitosan for improved solubility and fiber formation via electrospinning"; Cellulose; DOI 10.1007/s10570-007-9122-3, (Published online Jun. 10, 2007).

Hicks, Randall W.; et al. "Multilayered functional materials for heavy metal remediation." INOR 90, 2007 234th ACS National Meeting, Boston, MA, Aug. 19-23, 2007.

Juang, Ruey-Shin, et al.; "A simplified model for sorption of heavy metal ions from aqueous solutions on chitosan"; Water Research 36 (2002) 2999.

Kast, Constantia E., et al.;"Thiolated polymers—thiomers: development and in vitro evaluation of chitosab-thioglycolic acid conjugates"; Biomaterials, 22 (2001) 2345.

Li, N., et al.; Highly Enhanced Adsorption of Lead Ions on Chitosan Granules Functionalized with Poly(acrylic acid); Ind. Eng. Chem. Res., 2006, 45, 7897.

Liu, Changkun, et al.; "Selective removal of copper and lead ions by diethylenetriamine-functionalized adsorbent: behaviors and mechanisms"; Water Research 42(2008) 1511.

Merrifield, John D., et al.; "Uptake of mercury by thiol-grafted chitosan gel beads"; Water Research 38 (2004) 3132.

Mourya, V.K., et al.; "Chitosan-modifications and applications: Opportunities galore"; Reactive & Functional Polymers 68 (2008) 1013.

Prashanth, K.V. Harish, et al.; "Chitin/chitosan: modifications and their unlimited application potential—an overview"; Trends in Food Science & Technology 18 (2007) 117.

Prashanth, K. V. H., et al.; "Crosslinked chitosan—preparation and characterization"; Carbohydrate Research 341 (2006) 169.

Rangel-Mendez, J.R., et al.; "Chitosan selectivity for removing cadmium(II), copper(II), and lead(II) from aqueous phase: pH and organic matter effect"; Jl. Hazardous Materials 162 (2009) 503.

Sabarudin, Akhmad, et al.; "Synthesis of chitosan resin possesing 3,4-diamino benzoic acid moiety for the collection/concentration of arsenic and selenium in water samples and their measurement by inductively coupled plasma-mass spectrometry"; Analytica Chimica Acta 541 (2005) 207.

Vanka, K., Y., et al.; "Computational Modeling of Ligands for Water Purification Nanocoatings"; NSTI Nanotech 2008, vol. 3, Chap. 6; ISBN:978-1-4200-8505-1.

Vickaryous,W.J., et al.;"Arsenic-Π Interactions Stabilize a Self-assembled As2L3 Supramolecular Complex"; Angew. Chem. Int. Ed. 2004, 43, 5831.

Lee, Kyue-Hyung, et al.; Simultaneous determination of Trace Elements in River-water samples by ICP-MS ; Analytical Sciences, Jul. 2000, vol. 16, 731.

Gao, Yunhua, et al.; "Adsorption Behavior of Metal Ions on Crosslinked Chitosan . . . "; Analytical Sciences, Dec. 2000, vol. 16, 1303.

Vijaya, Y., et al.; "Modified chitosan and calcium alginate biopolymer sorbents for removal of nickel(II) through adsorption"; Carbohydrate Polymers, 72, 2, May 5, 2008, 261.

Popuri, S.R., et al.; "Adsorptive removal of copper and nickel ions from water using chitosan PVC beads"; Bioresource Technology, 100, 1, Jan. 2009, 194.

Sabarudin, A., et al.; Functionalization of chitosan with 3,4-dihydroxybenzoic acid for the adsorption/collection of uranium in water samples and its determination by inductively coupled plasma-mass spectrometry; Analytica Chimica Acta, 2007, 581, 214.

Nadavala, S.K., et al.; "Biosorption of phenol and o-chlorophenol from aqueous solutions on to chitosan-calcium alginate blended beads"; Jl.Hazardous Materials, 162, (2009) 482.

* cited by examiner

Figure 1
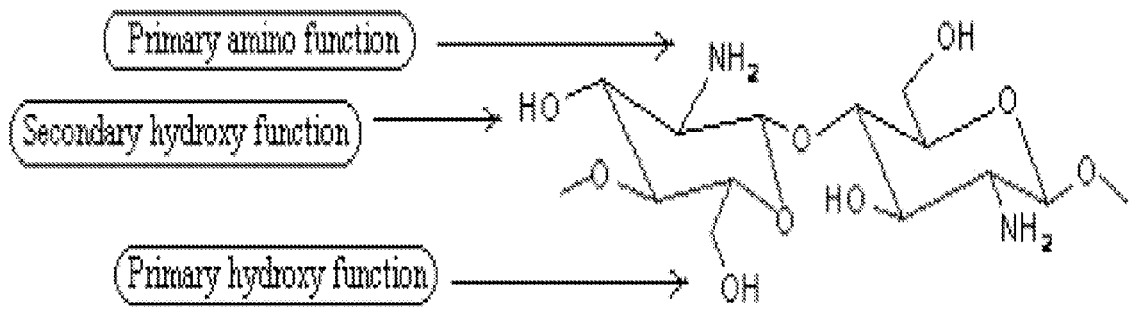
Figure 2  As per Sabarudin, Analytica Chimica Acta 581, (2007) 214
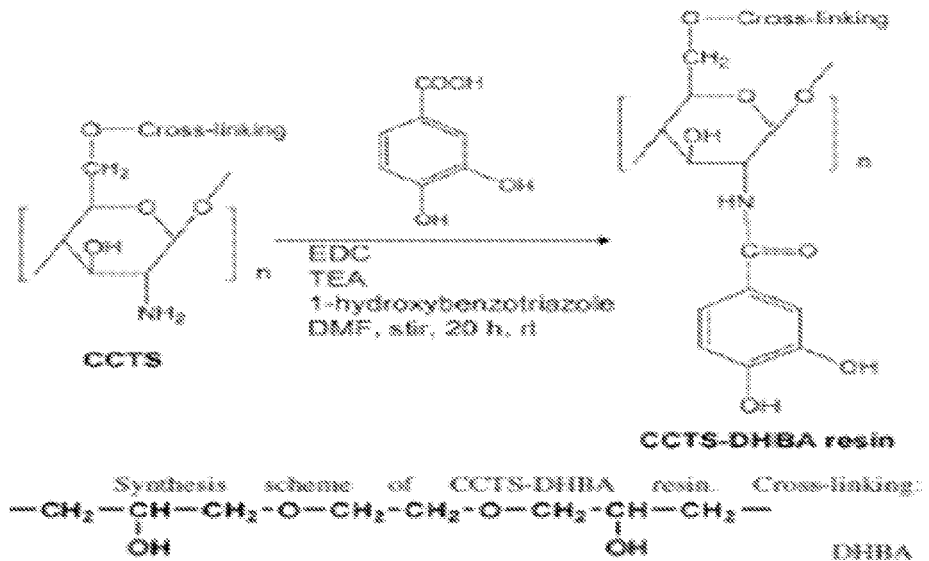

Figure 3   Metal Removal with Chitosan media

| | % Removed: 1- Cf/Ci | | | | |
|---|---|---|---|---|---|
| Challenge Metal: | Cu | Pb | Se | Zinc | Sulfate |
| Initial, ppm | 0.75 | 1.76 | 4.93 | 0.79 | 2,530 |
| Formulation # | | | | | |
| Chitosan | 0.3% | 15.7% | 25.3% | 1.1% | ---- |
| 49W | 97.2% | 60.2% | 28.8% | ---- | ---- |
| 54 | 99.7% | 73.1% | 35.8% | 8.9% | 7.2% |
| 54W | 99.96% | 83.0% | 49.1% | 10.3% | ---- |
| 56W | 99.1% | 93.0% | 55.2% | 7.6% | 13.4% |
| 55 | 7.7% | ---- | 1.9% | ---- | 10.5% |
| 55 S3 | ---- | 9.7% | 9.0% | 8.3% | ---- |
| 55 S9 | ---- | 3.2% | 6.8% | ---- | ---- |
| 55 S10 | 23.9% | 17.3% | 18.7% | ---- | 1.7% |

Figure 5

|  | Cd | Berkeley Pit, ppm | | | % Removed: 1- Cf/Ci | | | |
| --- | --- | --- | --- | --- | --- | --- | --- | --- |
| Challenge Metal | Cd | Co | Cu | Iron | Mn | Ni | Zinc | Sulfate |
| Initial, ppm | 2.14 | 2.01 | 128 | 635 | 238 | 1.22 | 622 | 22,200 |
| Formulation # | | | | | | | | |
| #47 | 4.7% | 3.0% | 99.98% | 1.9% | 2.5% | ---- | 2.6% | 57.9% |
| #49 | 6.5% | 3.5% | 99.98% | 1.6% | 1.7% | 2.5% | 1.8% | 50.5% |
| S4 | 0.5% |  | 5.5% | 6.1% | 2.9% | ---- | 3.2% | 41.4% |

CHITOSAN BASED ADSORBENT

PRIORITY

This application claims priority from U.S. Application 61/208,885 filed on Feb. 27, 2009 and included herein in its entirety by reference.

CROSS-REFERENCE TO RELATED APPLICATIONS

"Water Purifier with UV and Adsorbent"; application Ser. No. 11/297,163; filed on Dec. 7, 2005. "Adsorbent with Multiple Layers"; U.S. Pat. No. 7,491,669; filed on Feb. 7, 2006. "UV Reactor with Mixing Zones"; application Ser. No. 12/262,065 filed on Oct. 30, 2008.

INCORPORATION-BY-REFERENCE OF MATERIAL SUBMITTED

ABDEL-MAGID, AHMED F., et al.; "Reductive Amination of Aldehydes and Ketones with Sodium Triacetoxyborohydride. Studies on Direct and Indirect Reductive Amination Procedures"; J. Org. Chem. 1996, 61, 3849.

BERNKOP-SCHNURCH, ANDREAS, et al.; "Polymers with Thiol Groups: A new generation of Mucoadhesive Polymers?"; Pharmaceutical Research, Vol. 16, No. 6, 1999.

Boddu, V. M., Abburi, K., Talbott, J., Smith, E. D.; "Removal of Hexavalent Chromium from Wastewater using a New Composite Chitosan Biosorbent"; Environ. Sci. Technol., 2003, 37, 4449.

Boddu, V. M., Abburi, K., Talbott, J., Smith, E. D., Haasch, R.; "Removal of arsenic(III) and arsenic(V) from aqueous medium using chitosan-coated biosorbent"; Water Research, 2008 42, 633.

Carter, T. G., Yantasee, W., Sangvanich, T., Fryxell, G. E., Johnson, D. W., Addleman, R. S.; "New Functional materials for heavy metal sorption: "Supramolecular" attachment of thiols to mesoporous silica substrates"; www.rsc.org/chemcomm [Chem. Commun., 2008, 1-4.

Hicks, Randall W., Melanie A. Pitt, Shawn T. Blumberg, Darren W. Johnson, James M. Harris, and Lisa M. Farmen. "Multilayered functional materials for heavy metal remediation." INOR 90, 2007 234th ACS National Meeting, Boston, Mass., Aug. 19-23, 2007.

Kast, C. E., Bernkop-Schnurch, Andreas; "Thiolated polymers—thiomers: development and in vitro evaluation of chitosan-thioglycolic acid conjugates"; Biomaterials 22 (2001) 2345.

JUANG, RUEY-SHIN, et al.; "A simplified model for sorption of heavy metal ions from aqueous solutions on chitosan"; Water Research 36 (2002) 2999.

Li, N., Bai, R., Highly Enhanced Adsorption of Lead Ions on Chitosan Granules Functionalized with Poly(acrylic acid); Ind. Eng. Chem. Res., 2006, 45, 7897.

LIU, CHANGKUN, et al.; "Selective removal of copper and lead ions by diethylenetriamine-functionalized adsorbent: behaviors and mechanisms"; Water Research 42 (2008) 1511.

Merrifield, J. D., et al.; Uptake of Mercury by thio-grafted chitosan gel beads; Water Res., 2004 38, 3132.

Mourya, V. K., Inamdar, N, N.; Chitosan-modifications and applications: Opportunities galore; Reactive & Functional Polymers, 2008 68, 1013.

PRASHANTH, K. V. HARISH, et al.; "Chitin/chitosan: modifications and their unlimited application potential—an overview"; Trends in Food Science & Technology 18 (2007) 117.

PRASHANTH, K. V. HARISH, et al.; "Crosslinked Chitosan—preparation and characterization"; Carbohydrate Research 341 (2006) 169.

RANGEL-MENDEZ, J. R., et al.; "Chitosan selectivity for removing cadmium(II), copper(II), and lead(II) from aqueous phase: pH and organic matter effect"; Jl. Hazardous Materials 162 (2009) 503.

Sabarudin, A., Oshita, K., Oshima, M., Motomizu, S.; Synthesis of chitosan resin possessing 3,4-diamino benzoic acid moiety for the collection/concentration of arsenic and selenium in water samples and their measurement by inductively coupled plasma-mass spectrometry; Analytica Chimica Acta, 2005 542, 207.

Sabarudin, A., Oshita, K., Oshima, M., Motomizu, S., et al.; "Functionalization of chitosan with 3,4-dihydroxybenzoic acid for the adsorption/collection of uranium in water samples and its determination by inductively coupled plasma-mass spectrometry; Analytica Chimica Acta, 2007581, 214.

Vanka, K., Y. Houndonougbo, N. Lien, J. M. Harris, L. M. Farmen, D. W. Johnson, B. B. Laird, W. H. Thompson; Computational Modeling of Ligands for Water Purification Nanocoatings; NSTI Nanotech 2008, Vol. 3, Chap. 6; ISBN:978-1-4200-8505-1.

Vickaryous, W. J., Herges, R., Johnson, D. W.; "Arsenic—Interactions Stabilize a Self-Assembled $As_2L_3$ Supramolecular Complex"; Angew. Chem. Int. Ed. 2004, 43, 5831.

U.S. Patents and applications: U.S. Pat. No. 7,354,600; U.S. Pat. No. 4,879,340; U.S. Pat. No. 7,491,669; U.S. Pat. No. 5,900,479; U.S. Pat. No. 6,786,336; U.S. Pat. No. 4,882,066; U.S. Pat. No. 7,309,437; U.S. Pat. No. 5,578,217; U.S. 2006/0223965; U.S. 2006/0000783; 2008/0292706; U.S.2008/0149566; U.S.2008/0264857.

All references above are included herein in their entirety by reference.

BACKGROUND OF THE INVENTION

1. Field of the Invention

The invention discloses an adsorbent of predetermined composition comprising chitosan and one or more additional materials enabling removal of certain compound(s) from a fluid. A chitosan based adsorbent is functionalized and cross linked to a predetermined degree to enhance its capacity and selectivity for various molecules and/or ions; additional ligands may be added to enhance overall adsorption capacity.

2. Description of Related Art

The literature contains hundreds of references (Mourya, 2008) to chitosan and its ability to adsorb various heavy metals. Unfortunately no one has solved two key chitosan problems critical to commercialization for water purification. As conventionally synthesized chitosan is a fragile hydrogel containing about 90% water; chitosan beads, as a hydrogel, are too mechanically fragile to withstand commercial environments. Secondly, few researchers have explored low cost synthesis approaches, including low cost ligands, capable of metal removal at concentrations of interest, such as selenium at or below 25 ppb.

The positive features of chitosan are that it is abundant, non-toxic, relatively inexpensive and exhibits excellent adsorption capacities for metals. Almost all published work done on chitosan is as a hydrogel. The instant invention discloses a chitosan material with sufficient physical strength and metal removal capacity to be commercially attractive.

Metal removal with conventional metal oxide adsorbents to establish the "state-of-the art" is presented. Various methods have been published for processing chitosan into a hydrogel; Merrifield, 2004; Boddu, 2008; Li, 2006; Sabarudin, 2006 are examples.

Portier in U.S. Pat. No. 4,882,066 teaches coating a porous solid with a multi-micron thick film of chitosan. Portier demonstrated removal of various metals from streams; however Portier did not disclose or suggest the need for a crosslinking agent or compound or a ligand for metal binding Like Boddu, Portier did not consider or suggest the benefit of sub-micron particles in combination with chitosan and additional compounds.

Boddu, U.S. Pat. No. 6,786,336, teaches a "composite chitosan biosorbent" comprising a ceramic support, twice coated with a chitosan gel material. Boddu teaches an ultra fine ceramic of alumina or silica having a particle size from about 10 to about 150 microns. Boddu teaches to acid wash, rinse and then dry the ceramic prior to application of a first chitosan gel, followed by drying and application of a second chitosan coating and then drying; the final product being about 21% chitosan by weight. Good adsorption is shown for chromium (VI), Boddu, 2003, in sulfate and chloride at chromium concentrations above 20 ppm.

As taught by Prashanth (2006), chitosan undergoes radical-induced depolymerization in the presence of potassium persulfate at 60° C., leading to extensive crosslinking of the fragmented chains on subsequent cooling at 4° C. As a result, a possible conformational change leading to higher crystallinity, is observed. In crosslinked chitosan, the polymeric chains are interconnected by crosslinkers, leading to the formation of a 3D network. They can be formed by complexation with another polymer, generally ionic, or by aggregation after chitosan grafting. Crosslinkers are molecules of molecular weight much smaller than those of the chains between two consecutive crosslinks. Other components such as additional polymers to form a hybrid polymer networks (HPN) or semi- or full-interpenetrating polymer networks (IPN) can be added during the crosslinking reaction. The biocompatibility of such modified chitosans has not yet been assessed, due to the presence of traces of potentially toxic auxiliary molecules or crosslinkers, whose administration in humans may be problematic. To date, the most common crosslinkers used with chitosan are dialdehydes such as glyoxal and in particular glutaraldehyde. However, the main drawback of such reactions is that they are generally considered to be toxic. For example, glutaraldehyde is known to be neurotoxic, its fate in the human body is not fully understood and glyoxal is known to be mutagenic. Therefore, even if products are purified before administration, the presence of free unreacted dialdehydes in the products can not be completely excluded. Besides dialdehydes, crosslinkers such as diethyl squarate, oxalic acid or genipin can exhibit direct crosslinking mechanisms, although they remain incompletely elucidated. Crosslinked chitosan can also be formed by direct interaction between polymeric chains, without the addition of crosslinkers. An example is crosslinked chitosan, which was formed as a byproduct of persulfate-induced free radical graft copolymerization.

U.S. Pat. No. 7,354,600 and Kast 2001 teach a thiolated polymer, optionally chitosan, with favorable mucoadhesive properties for in-vitro drug delivery.

There is a need for a low cost adsorbent effective on effluent streams of industrial origin and also applicable to water purification in general.

BRIEF SUMMARY OF THE INVENTION

The instant invention discloses a chitosan based adsorbent useful for removing metals and other compounds from fluid environments, including aqueous, non-aqueous and vapor based mediums. In some embodiments an adsorbent comprises chitosan and a ligand; in some embodiments an adsorbent comprises chitosan, a support structure and a ligand; in some embodiments an adsorbent comprises chitosan, and a metal oxide as a support structure; in some embodiments an adsorbent comprises chitosan and one or more ligands; in some embodiments an adsorbent comprises one or more chitosan based adsorbents. In some embodiments an adsorbent comprises chitosan beads with a water content less than 20% by weight after drying; in some embodiments an adsorbent comprises chitosan with an initial water content less than 10% by weight after drying; in some embodiments an adsorbent comprises chitosan with a water content less than 5% by weight after drying; in some embodiments an adsorbent comprises chitosan and a water content less than 1% by weight; as used herein "after drying" refers to the state of a chitosan bead or particle during processing and after a drying step wherein the porosity or macro/micro-structure of a bead may be adjusted.

BRIEF DESCRIPTION OF THE DRAWING(S)

FIG. 1 is a schematic of chitosan and its components.

FIG. 2 is prior art for synthesizing a cross-linked chitosan based adsorbent.

FIG. 3 shows results for adsorbing lead and selenium from water with sulfate.

FIG. 5 shows results for adsorbing metals from mine water with sulfate.

DETAILED DESCRIPTION OF THE INVENTION

Figure 4:
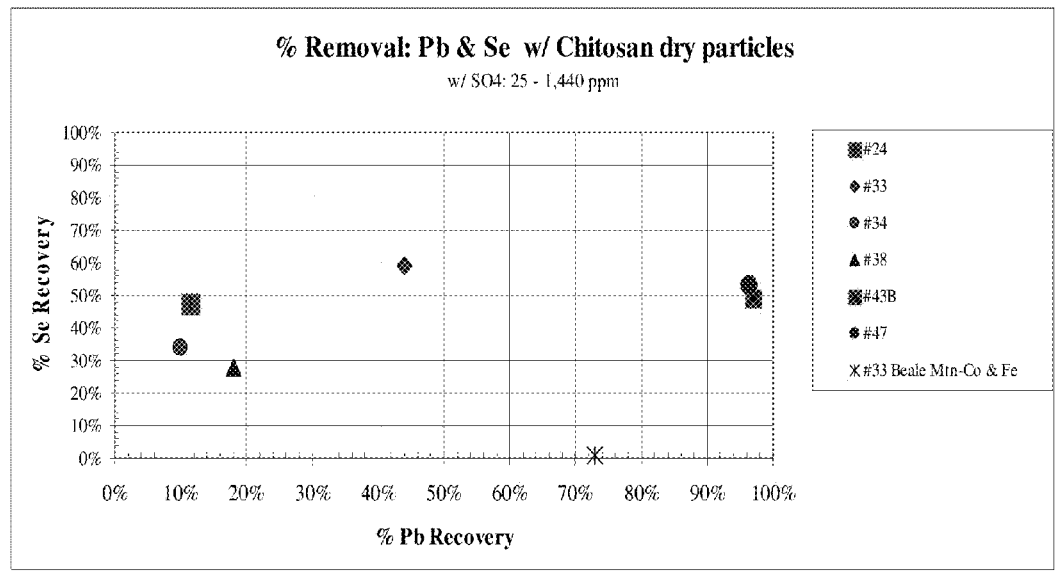
FIG. 4 shows results for adsorbing metals from water with sulfate.

The following discussion is presented to enable a person skilled in the art to make and use the invention. Various modifications to the described embodiment are readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Data for various chitosan hydrogel beads synthesized by several methods are presented. For most data presented the adsorbent material was exposed to about 250 mL of challenge solution for two hours, magnetically stirred and at room temperature. In some cases the acidity of the challenge solution was adjusted to a pH of 4, with either $H_2NO_3$ or $H_2SO_4$, prior to adsorbent exposure. For chitosan hydrogel material about 10 to 15 grams was used per trial, converting to about 1 g of actual chitosan after dehydration. For "dry" chitosan between one to two grams was used. The data is presented as R, "% metal removed", where:

$$R = (1 - Cf/Ci) \qquad (1)$$

and Cf and Ci are the final and initial concentration in parts by weight of the metal or compound of interest in the challenge solution.

The challenge solution and residual solution were analyzed with an ICP-MS by Test America laboratory in Beaverton, Oreg. using EPA certified water laboratory protocols. Data taken by CCT for commercially available titania and alumina based adsorbents are presented also to provide comparison to the chitosan results. Dow's Adsorbsia™ and Hydroglobe's Metsorb™ are titania based; alumina was supplied by Sasol.

Metal removal levels for the metal oxides perform about well in city water but poorly in high TDS water; the presence of as little as 25 ppm sulfate, from $Na_2(SO_4)$, seriously impacts the metal adsorption capacity. This is a serious deficiency when dealing with non-municipal water sources. Additional data and discussion are found in Hicks, 2007, Johnson, 2009 and Vanka, 2008.

Example Embodiments of the Invention

Chitosan, CAS No. [9012-76-4], is supplied by TCI America, [www.tciamerica.com] and/or Donboo Amino Acid Co., [www.donboo.com]. The molecular weight may range from about 100,000 to 2,000,000; the degree of deacetylation may range from about 50% to over 90%.

In some embodiments chitosan is dissolved in at least one of acetic acid, hydrochloric acid and/or oxalic acid; additional water or an organic solvent may be added. This mixture is stirred for about 30 min. or until the chitosan is completely dissolved; in some embodiments the mixing is at room temperature; temperatures below 70° C. are preferred. In some embodiments additional compounds are added as described in Mourya. For example Bernkop-Schnurch and Kast describe activating carboxylic acid moieties of chitosan by the addition of 1-ethyl-3-(3-dimethylaminopropyl)carbodiimide hydrochloride, termed EDAC or EDC, prior to forming a conjugate with L-cysteine monohydrate hydrochloride or thioglcolic acid, TGA. Alternative ligands are listed in the supplementary material.

In one embodiment 2 g of Nyacol AL2OSD was added to 200 mL of water heated to 50° C.; stirred for 10 min.; 4 g of oxalic acid was added; stirred for 1 hr.; 6 g of chitosan was added; stirred for 1 hr.; 4 g of cysteine was added; the temperature was raised to 60° C.; after 5 min 2 mL of 50% aqueous gluteraldehyde was added; gelling was observed after about 10 min. The gel was poured into a container and allowed to air dry; optionally it was air dried for 12-48 hours and then vacuum dried at 40-75° C. for more than 6 hrs to enable a "honeycomb" structure.

In one embodiment 5 g of chitosan was added to 40 mL of 1 M HCl stirred for 30 min.; 100 mL of water was added and stirred for 30 min.; 45 mL of 0.5 M NaOH was added to achieve a pH of about 4; 10 g of EDC was added and stirred for 20 min; 5 mL of TGA was added and stirred for 1 hr.; 20 mL of 5% aqueous gluteraldehyde was added and stirred for 15 min.; the mixture was air dried; optionally it was air dried for 12 hours and then vacuum dried at 40-75° C. for more than 6 hrs to enable a "honeycomb" structure.

In one embodiment 20 g of chitosan was added to 7 mL of 39% HCl in 155 mL of water; stirred for 60 min.; 0.5 M NaOH was added to achieve a pH of about 3.5; this mixture was added to a mixture of 5 g of boehmite alumina, 2 g of oxalic acid, 100 mL of water, 25 g of TGA; the pH was adjusted to about 4.5 with addition of about 1 g of solid NaOH. The combined solution was stirred for about 30 min.; a slight purple color was noted; 20 mL of 5% aqueous gluteraldehyde was added and stirred for 15 min.; the mixture was air dried overnight and then placed in a vacuum oven at 50° C. and a vacuum higher than 25 in Hg until completely dehydrated. Alternatively, other metal oxides such as Nyacol AL2OSD, gamma alumina, titania, or others known to one knowledgeable in the art, may be used in place of, or in addition, to Sasol boehmite; in some embodiments the particle size of the alumina, or alternative metal oxide additive, is less than about 5 microns; optionally the size is less than about 1 micron; optionally the size is between about 50 nm and 1,000 nm; optionally the size is about 100 nm.

In some embodiments acid-chitosan mixture was treated with about 0.4 mM to 1 mM potassium persulfate at 60-75° C. for 30 min to 120 min, prior to addition of exemplary ligands and metal oxide binders. No additional crosslinkers were required for some applications.

In one embodiment 5 g of chitosan is added to a mixture of 3 mL of acetic acid and 125 mL of tetrahydrofuran, THF, CAS No. 109-99-9; 3 mL of pyridine carboxaldehyde is added; this solution is stirred for one hour; 5 g of $Na(Oac)_3BH$, sodium triacetoxyborohydride, is added and the solution stirred for another 12 hr. or longer until there is separation of the organic and aqueous phases. Optionally, the phases are stirred together and 20 mL of 5% aqueous gluteraldehyde is added and stirred for 15 min.; the mixture is air dried overnight and then placed in a vacuum oven at 50-75° C. and a vacuum higher than 25 in Hg until completely dehydrated. This embodiment discloses a protocol for reductive amination of chitosan. The drying procedure, including an air drying step, is critical to achieve a "honeycomb structure" of the dehydrated chitosan based adsorbent. A critical step is an initial stage that enables a lattice structure to form in the chitosan prior to all of the water being removed; this may require from 12 to 72 hours depending on the temperature, and other conditions affecting evaporation rate, such as vacuum level. Too rapid removal of water or other solvent leads to a solid mass of chitosan with little or no porosity. Optionally a metal oxide binder is added prior to addition of a crosslinking agent such as gluteraldehyde; optionally gluteraldehyde is used in place of pyridine carboxaldehyde; optionally chitosan and potassium persulfate, or other persulfate, are mixed and reacted at 60-70° C. prior to addition of pyridine carboxaldehyde.

In some embodiments additional compounds and/or ligands are chosen from a list comprising:

Formal Name: 2,4-(dimercaptomethyl)benzene

Molecular Weight: 170.20 g/mol

CAS: 105-09-9

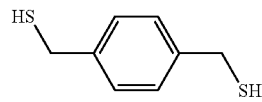

Formal Name: 4-(mercaptomethyl)benzoic acid Molecular Weight: 168.10 g/mol
CAS: 39088-68-8

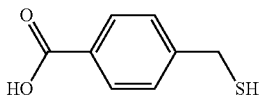

Terephthalic Acid
  Formal Name: 1,4-Benzenedicarboxylic acid
  Molecular Weight: 166.13 g/mol
  CAS: 100-21-0

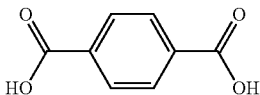 [SMILES: O=C(O)c1ccc(C(=O)O)cc1]

Cysteine
  Formal Name: (+)-2-Amino-3-mercaptopropionic acid
  Molecular Weight: 121.16 g/mol
  CAS: 52-90-1
  Source:

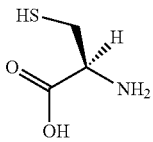

Cysteine Hydrochloride
  Formal Name: (+)-2-Amino-3-mercaptopropionic acid monohydrochloride
  Molecular Weight: 157.90 g/mol
  CAS: 52-89-1

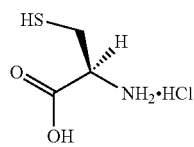

3-Mercaptopropionic Acid
  Formal Name: 3-mercaptopropionic acid
  Molecular Weight: 106.14 g/mol
  Density: 1.22 g/mL
  Boiling Point: 116° C. @ 13 mm Hg
  CAS: 107-96-0
  Source: Alfa Aesar

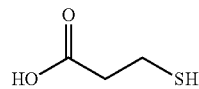

4-mercaptobenzoic acid
  Formal Name: 4-mercaptobenzoic acid
  Molecular Weight: 154.19
  CAS: 1074-36-8
  Source: TCI America

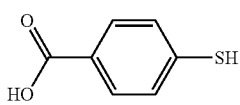

Mercaptoacetic Acid
  Formal Name: 2-mercaptoacetic acid
  Alternative Name: Thioglycolic acid, TGA
  Molecular Weight: 92.12
  Density: 1.325 g/mL
  Boiling Point: 96° C. @ 5 mm Hg
  CAS: 68-11-1
  Source: Aldrich

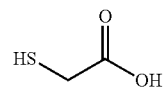

(3-mercaptopropyl)trimethoxysilane
  Formal Name: (3-mercaptopropyl)trimethoxysilane
  Molecular Weight: 196.34
  Density: 1.06 g/mL
  Boiling Point: 112° C. @ 5 mm Hg
  CAS: 4420-74-0
  Source: Alfa Aesar

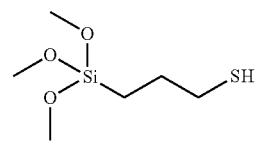

(3-mercaptopropyl)triethoxysilane
  Formal Name: (3-mercaptopropyl)triethoxysilane
  Molecular Weight: 238.42 g/mol
  Density: 0.99 g/mL
  Boiling Point: 115° C. @ 14 mm Hg
  CAS: 14814-09-6
  Source:

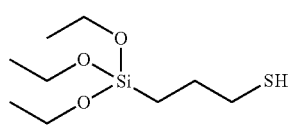

Trichloro(3-chloropropyl)silane
  Formal Name: Trichloro(3-chloropropyl)silane
  Molecular Weight: 211.97 g/mol
  Density: 1.36 g/mL
  Boiling Point: 178° C.
  CAS: 2550-06-3
  Source: TCI America
L-lysine
Vinyl butyrate
"Second Generation", Chitosan Ligands
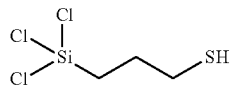
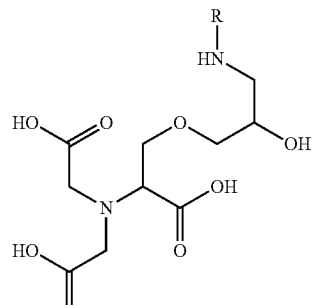
"SDA"
NL2112
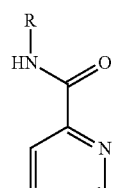
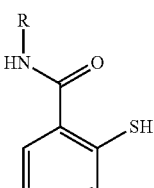
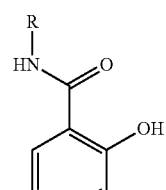
JTG2022  JTG2023  JTG2024
JTG2051  JTG2052  JTG2053
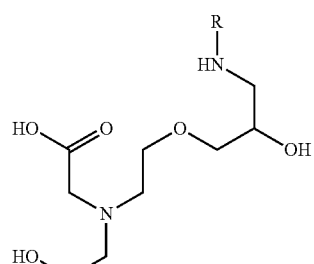
NL2110
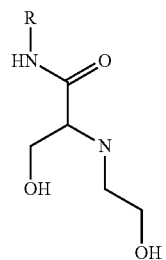
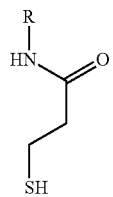
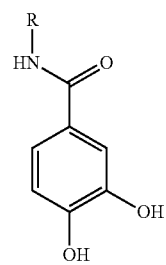
JTG2025  JTG2026  JTG2027
JTG2054  JTG2055  JTG2056
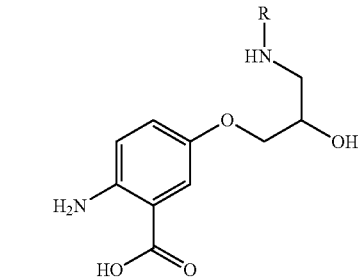
"AHBA"
NL2108
NL2117
NL2119
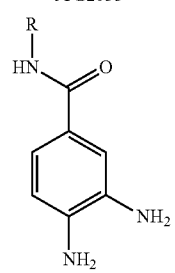
JTG2065
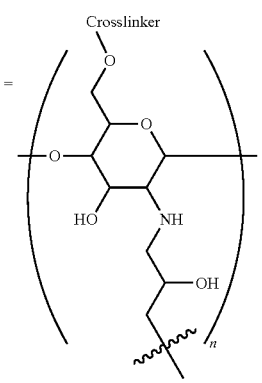
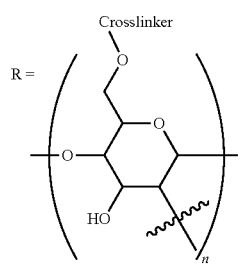

In some embodiments an additional compound and/or metal oxide is chosen from a group comprising the following:
Nanoscale Alumino Oxide
Nanoscale $TiO_2$
Nanoscale Alumino Oxide+ mesh −16-+35 [AC308-0100]— Lot #308-0001
Nanoscale Alumino Oxide mesh −16-+35 [AC303-0025]— Lot #303-0001
Nanoscale $TiO_2$ mesh −16-+35 [AC312-0025]—Lot #312-0001
Nanoscale $TiO_2$ inexpensive
Sasol Boehmite
Sasol Alumina Spheres
Sasol Alumina Oxide Pural NW Boehmite
Sasol Alumina Spheres Product Code 604130; 1,8/210
Sasol Alumina Trilobe SIRALOX 30, Lot: E397, Spec.: 670100
Sasol Trilobe
Hydroglobe Metsorb $TiO_2$
Dow Chemical Adsorbsia $TiO_2$
NanoDynamics Ceramic
NanoDynamics Pulverized Ceramic
NanoDynamics Pressed Zero-Valent Iron Pellet
Zeolite
Colloidal alumina, colloidal titania, colloidal silica FIG. 1 shows the basic polymer structure of chitosan with associated amino and hydroxyl functional groups. FIG. 2 is prior art for synthesizing a cross-linked chitosan based adsorbent as per Sabarudin, Analytica Chimica Acta 581, (2007) 214

FIG. 3 shows results for adsorbing lead and selenium from water with up to 1,440 ppm sulfate for several chitosan based compositions as disclosed herein. FIG. 4 shows additional results for adsorbing metals from water with 2,530 ppm sulfate. FIG. 5 shows results for adsorbing metals from mine water from the Berkeley Pit in Montana. Note the low adsorption of iron which is very advantageous versus the high adsorption of copper.

Figure 6:
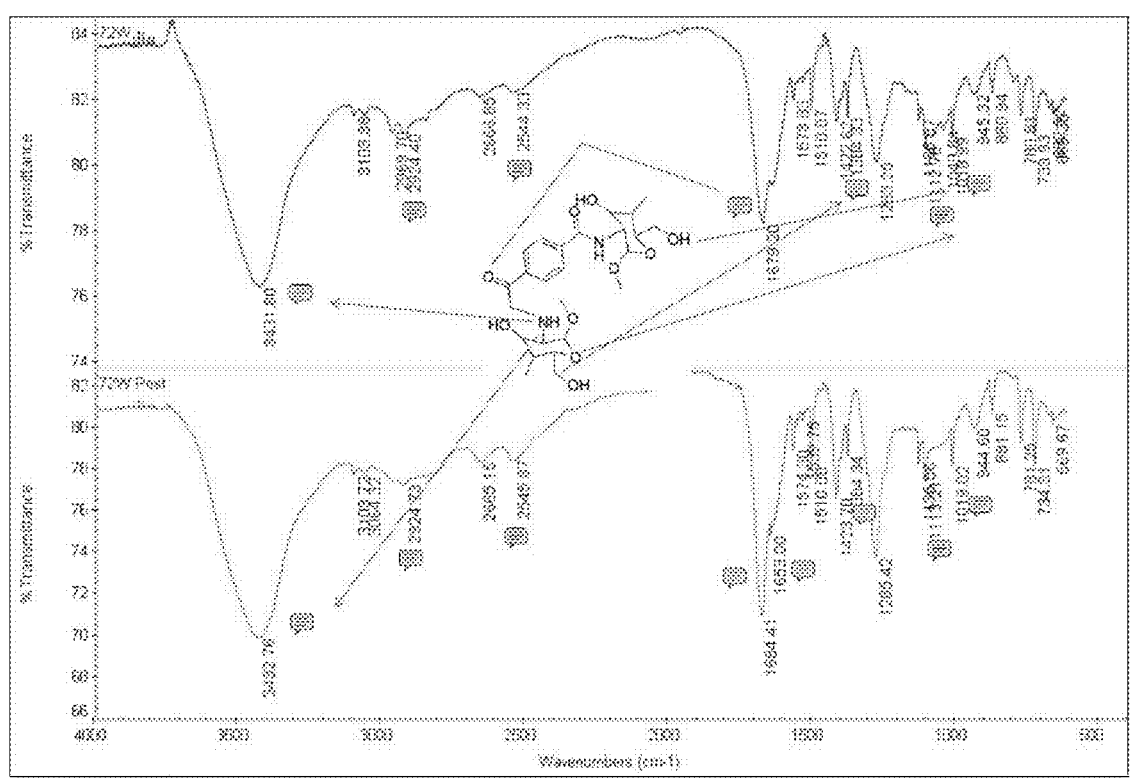
FIG. 6 shows an FTIR scan of a composition before and after metal adsorption.

FIG. 6 shows an FTIR scan of a chitosan based composition before and after metal adsorption; adsorption peaks for several compounds are indicated.

Figure 7:
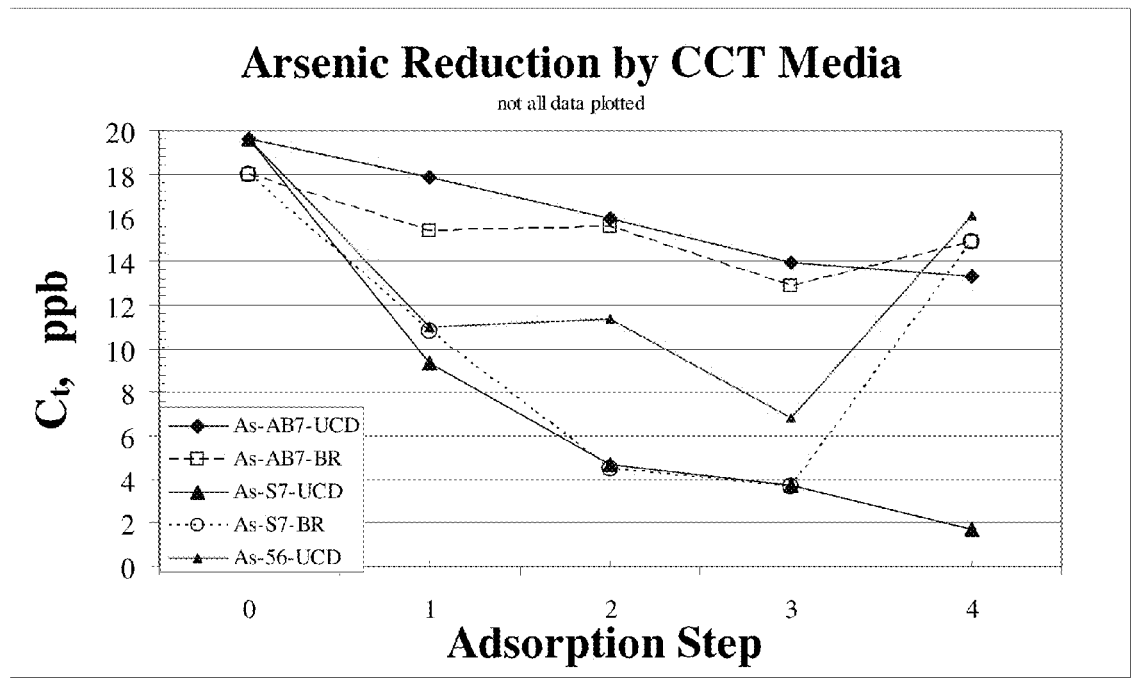
FIG. 7 shows results for arsenic adsorption for several chitosan compositions.
Figure 8:
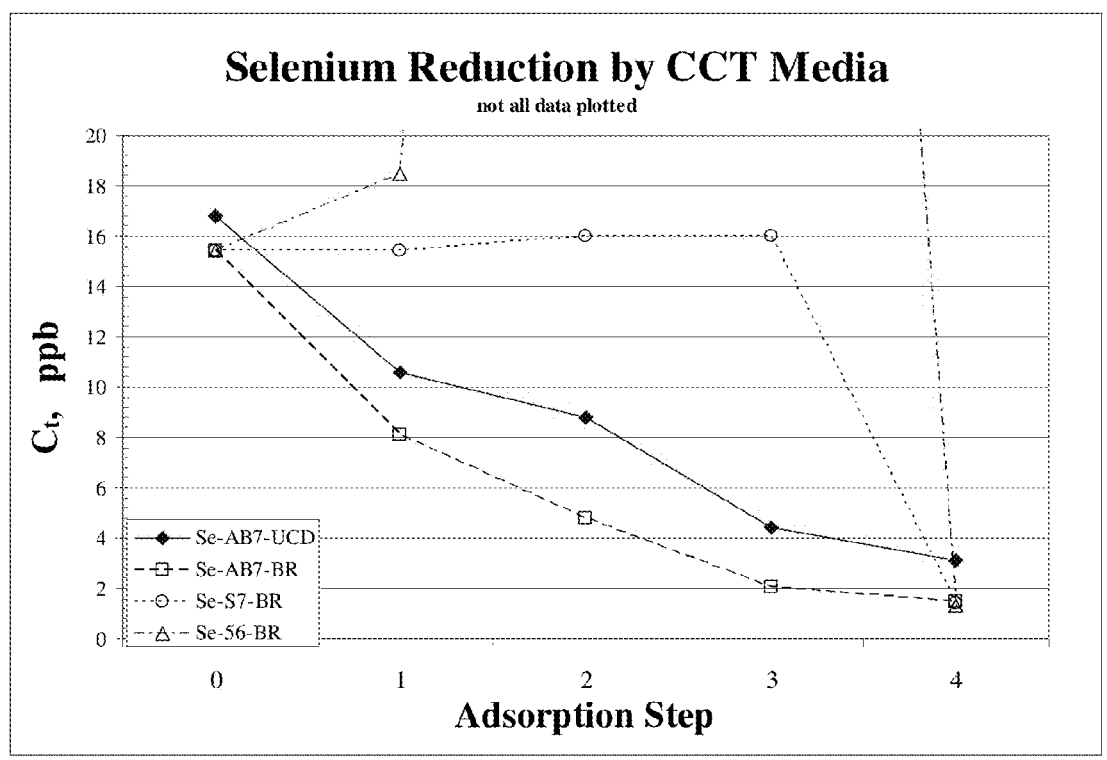
FIG. 8 shows results for selenium adsorption for several chitosan compositions.

FIGS. 7 and 8 show results for arsenic and selenium adsorption for several chitosan compositions at extremely low levels, initially about 20 ppb; in some cases more than 90% removal is achieved after four successive adsorption steps. The water was taken from a coal fired electric power plant waste water pond; TDS was above 2,000 ppm and multiple metals, typical of coal, were present. Reduction to this low level by an adsorbent has not been reported previously. The test was four adsorption steps; adsorbent was 0.4 g per 100 mL of waste water at each step; step duration was two hours. Analysis was by ICP-MS at two different laboratories, University of California, Davis and Brooks Rand of Seattle.

In some embodiments an adsorbent may comprise combinations of metal oxides based upon the metals or other materials designated for removal from a solution. In some embodiments an adsorbent may comprise combinations of chitosans comprising different ligands and different linking agents and different crosslinking agents. In some embodiments a chitosan based adsorbent comprises hydrogels in combination with dehydrated or partially dehydrated chitosan. As used herein a chitosan hydrogel comprises at least 80% by weight water; a dehydrated or partially dehydrated chitosan comprises less than 50% water. In some embodiments a chitosan based adsorbent comprises a cellulose component.

In some embodiments a chitosan based adsorbent is configured in a cylindrical cartridge with a diameter to length ratio of about 1 to 6; comprising, optionally, carbon initially, followed by a chitosan based adsorbent. The water enters to, optionally, carbon and then a chitosan based adsorbent; optionally other filter or osmotic modules may be up or down stream.

In some embodiments a composition of matter comprising chitosan; optionally a ceramic, and, optionally, another compound associated with the chitosan and/or the ceramic and/or entangled with the chitosan and/or a ceramic wherein the chitosan is more than about 25% by weight and; optionally, such that 1 gram of the composition can adsorb more than 0.1 milli-gram of a dissolved, typically ionic, compound per gram of the composition placed in a fluid; optionally, a compound is a metal ion chosen from a group comprising any metallic compound including, but not limited to, selenium, lead, mercury, arsenic, copper, nickel, uranium and/or cobalt, additionally oxyanions and other soluble and/or chelated forms of the listed metals; optionally, of concentration about 1 ppm; optionally, of concentration about 10 ppm; optionally, of concentration about 0.1 ppm; optionally, of concentration about 0.01 ppm; optionally, within about 2 hours; optionally, within about 1 hour; optionally, within about 0.5 hour; optionally, at a pH of about 4; optionally, at a pH of about 6; optionally, at a pH range from about 3 to about 9; optionally, of concentration range from about 500 ppm to about 1 ppb.

Optionally, a composition comprises a polymer, optionally, chitosan, at more than about 5% and less than about 95% by weight; optionally a composition comprises cellulose; optionally a composition comprises another polymer or compound. Optionally, a composition of matter comprises less than 20% by weight water initially; optionally, another polymer or compound comprises a thiol group; optionally, another polymer or compound comprises a carboxyl group; optionally, another polymer or compound comprises a hydroxyl group; optionally, another polymer or compound comprises an amine group; optionally, another polymer or compound comprises an amide group; optionally, another polymer or compound comprises an iimide group; optionally, another polymer or compound comprises a functional group suitable for attaching to one or more elements selected from the periodic table in an ionized state or combined with oxygen, or not.

In some embodiments a composition comprises a support structure as a scaffold for a polymer, optionally chitosan, to adhere to; an example of prior art in this area is found in U.S. Pat. No. 6,786,336. A support structure adds rigidity to a chitosan coating around the structure's exterior. A support structure may be a solid or porous ceramic or organic such as a resin; examples are alumina, titania, silica, zeolite, an organic, such as polyvinyl chloride, macroporous resin, microporous resin and mixtures thereof.

Optionally, another polymer or compound is a ligand; optionally, another compound is a mono-functional ligand; optionally, another compound is a bi-functional ligand; optionally, another compound is two or more polymers or compounds; optionally another polymer or compound is a polymer or compound which enables crosslinking of the chitosan, an exemplary compound is gluteraldehyde. Optionally, another polymer or compound is a non-symmetrical, bi-functional ligand; wherein a non-symmetrical, bi-functional ligand is a bi-functional ligand with non-identical active groups; one active group may be a thiol and one active group may be a carboxyl; examples are 4-(mercaptomethyl)benzoic acid, cysteine, 3-Mercaptopropionic Acid, Thioglycolic acid, and others known to one knowledgeable in the art.

In some embodiments a fluid is an aqueous solution comprising sulfate and other compounds known to be in sea water at concentrations higher or lower than typical sea water or surface water or well water or mining discharge water or industrial discharge water. In some embodiments a fluid is an aqueous solution comprising deionized water; in some embodiments a fluid is an aqueous solution comprising blood or other biological based fluid such as plasma or urine; in some embodiments a fluid comprises a gas such as air.

As used herein, "associated" means chemically bonded, or at least chemically "attracted" wherein a compound aligns with a composition comprising chitosan in a fashion that is not by conventional chemical bonding but none-the-less a compound is not easily removed from a composition comprising chitosan by washing. As used herein, "entangled" means mechanically ensnared such that a compound is not easily removed from a composition by washing wherein washing is meant to be stirring in water for a period of time. In some embodiments an adsorbed compound is a metal, a metal ion, a metal ion complex or a mixture; in some embodiments an adsorbed compound another type of including non-metals, halogens, nitrates, phosphates, pharmaceuticals, organics and others known to one knowledgeable in the field.

In some embodiments a composition of matter comprising chitosan is prepared by mixing an amount of chitosan with aqueous 1M HCl to dissolve and form a clear solution; approximately 20 ml of 1M HCl per gram of chitosan; next the chitosan solution is mixed with 0.33 M trisodium phosphate to achieve a pH of 6; that solution is then reacted with pivalic ester of TGA-pivalic mixed anhydride; followed by hydrolysis of pivalic thioester at pH 1; next the solution pH is adjusted to 6 with NaOH solution; next crosslinking of derivatized chitosan with glutaraldehyde, 25% aqueous solution; followed by reduction of the glutaraldehyde cross linked chitosan derivative with sodium borohydride; and then hydrolysis of borate esters with 1M HCl; followed by pH adjustment to 5 with distilled water washes; finally the composition is dried under vacuum at mild heat, such as 40-65° C.; optionally the composition comprising chitosan is freeze dried at around −40° C. and under mild vacuum such as 1-50 torr.

In some embodiments chitosan is prepared in a derivatized state, or a deprotected state or a cross linked state or a combination of two or more states; optionally chitosan may be reduced with sodium borohydride. In some embodiments chitosan is prepared as follows: 1) Remove sample of stock solution then change pH to reaction parameter, 2) add reactant, 3) react sample for the specified period, 4) change reaction conditions to hydrolyze protecting group, 5) change reaction conditions to allow crosslinking, 6) add crosslinking agent and allow to react, 7) break up gel, 8) wash gel at various pH, 9) wash gel with distilled water to remove salts, 10) place in drying oven, 11) dry for as long as it takes to get dry IR sample, run IR, interpret IR.

In some embodiments a terephthalic acid derivatized chitosan is synthesized; optionally, non-reduced or reduced with sodium borohydride; optionally, washed repeatedly and vacuum dried; optionally, acetic acid, or oxalic acid and or calcium carbonate or calcium chloride may be added.

In some embodiments a chitosan chelating resin containing iminodiacetate functional group is prepared. In some embodiments a starting material is "Chitopearl", AL-01, from Fuji Spinning Co. Ltd., Tokyo. In some embodiments a chitosan based material is cross linked with ethylene glycol diglycidyl ether, EGDE and has a 3,4-diamino benzoic acid moiety, optionally, a 3,4-dihydroxybenzoic acid moiety, optionally, 2-amino-5-hydroxy benzoic acid moiety, optionally, serine diacetic acid moiety, optionally, 3-nitro-4-amino benzoic acid moiety, optionally, threonine moiety, optionally, amino acids such as glycine, valine, leucine, serine moieties, optionally, phenylarsonic acid moiety, optionally, catechol and/or salicylic acid moiety; optionally a chitosan composition may contain regions of one or more moieties.

In some embodiments a bi-functional ligand and/or a non-symmetrical bi-functional ligand may be added to a chitosan based composition to enable higher adsorption capacity after the manner taught in U.S. Pat. No. 7,491,669.

Preferred polymers for use in the present invention are selected from the group consisting of: poly(N-methylvinylamine), polyallylamine, polyallyldimethylamine, polydiallylmethylamine, polydiallyldimethylammonium chloride, polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethyaminoethylmethacrylate), polyethyleneimine, polylysine, DAB-Am and PAMAM dendrimers, polyaminoamides, polyhexamethylenebiguandide, polydimethylamine-epichlorohydrine, aminopropyltriethoxysilane, N-(2-aminoethyl)-3-aminopropyltrimethoxysilane, N-trimethoxysilylpropyl-N,N,N-trimethylammonium chloride, bis(trimethoxysilylpropyl)amine, chitosan, cellulose, grafted starch, the product of alkylation of polyethyleneimine by methylchloride, the product of alkylation of polyaminoamides with epichlorohydrine, polyacrylamide with monomers, dimethyl aminoethyl acrylate methyl chloride (AETAC), dimethyl aminoethyl methacrylate methyl chloride (METAC), acrylamidopropyl trimethyl ammonium chloride (APTAC), methacryl amodopropyl trimethyl ammonium chloride (MAPTAC), diallyl dimethyl ammonium chloride (DADMAC), ionenes, silanes and mixtures thereof.

In some embodiments a composition of matter comprises a polymer, such as chitosan, and a ligand wherein the chitosan is at least 10%, more than about 25%, more than 50% or more than 75% by weight of the composition; at some point a composition may adsorb additional water after a drying step, such that 1 gram of the composition is operable to adsorb more than 0.1 milli-gram of a metal ion per gram of the composition in a 250 mL aqueous solution of pH between about three and eight, comprising an initial metal ion concentration of more than 1 ppm by weight within about two hours; optionally, the aqueous solution further comprises more than 100 ppm sulfate anions; optionally, a composition further comprises a support structure of at least 10% by weight; optionally, the metal ion is chosen from a group consisting of lead, selenium, mercury, cadmium, arsenic, copper and mixtures thereof; optionally, the chitosan is less than 100% cross linked; optionally, the chitosan is less than 100% cross linked by a glutaraldehyde or EDGE based compound For purposes of this disclosure the following compounds are exemplary ligands such as thioglycolic acid, terephthalic Acid, cysteine, cysteine hydrochloride, 3-mercaptopropionic acid, 4-mercaptobenzoic acid, mercaptoacetic acid, (3-mercaptopropyl)trimethoxysilane, (3-mercaptopropyl)triethoxysilane, trichloro(3-chloropropyl)silane, 3,4-diamino benzoic acid, a 3,4-dihydroxybenzoic, 2-amino-5-hydroxy benzoic acid moiety, serine diacetic acid moiety, 3-nitro-4-amino benzoic acid moiety, threonine moiety, amino acids such as glycine, valine, leucine, serine moieties, phenylarsonic acid moiety, catechol and/or salicylic acid moiety, oxalic acid, other organic acids and mixtures thereof.

In some embodiments a composition of matter comprises a polymer, such as chitosan, a support structure; and a ligand wherein the chitosan is more than about 25% by weight and such that 1 gram of the composition is operable to adsorb more than 0.1 milli-gram of a metal per gram of the composition in a 250 mL, optionally, aqueous solution, of pH between about two and nine with an initial metal concentration of more than 10 ppm within about two hours; optionally, the aqueous solution further comprises more than 100 ppm sulfate anions and the metal ion is chosen from a group consisting of lead, selenium, mercury, cadmium, arsenic, copper and mixtures thereof; optionally, the support structure comprises at least 10% by weight and is chosen from a group consisting substantially of alumina, titania, silica, zeolite, an organic, such as polyvinyl chloride, macroporous resin, microporous resin and mixtures thereof. In some embodiments a chitosan based composition is operable to desorb an adsorbed compound under certain conditions; optionally, a condition is in a solution, optionally, aqueous with a pH less than 3 or less than 2.

In some embodiments a composition of matter comprises chitosan; and one or more ligands chosen from a group consisting of thioglycolic acid, terephthalic acid, cysteine and cysteine hydrochloride; wherein the chitosan is between about 20% and 90% by weight after drying and the ligands are more than about 2% by weight and the chitosan is cross linked between about 15% and 85% such that one gram of the composition is operable to adsorb more than 0.1 milli-gram of a metal per gram of the composition in a 250 mL aqueous solution of pH between about two and nine with an initial metal concentration of more than 1 ppm within about two hours.

Foregoing described embodiments of the invention are provided as illustrations and descriptions. They are not intended to limit the invention to precise form described. In particular, it is contemplated that functional implementation of invention described herein may be implemented equivalently. Alternative construction techniques and processes are apparent to one knowledgeable with fluid mechanics, synthetic and/or physical chemistry. Other variations and embodiments are possible in light of above teachings, and it is thus intended that the scope of invention not be limited by this Detailed Description, but rather by Claims following.

We claim:

1. A composition of matter comprising:
   chitosan; and
   a ligand wherein the chitosan is more than about 25% by weight of the composition and wherein the chitosan is crosslinked between about 15% and 85% such that one gram of the composition is operable to adsorb more than 0.1 milli-gram of a metal ion per gram of the composition in a 250 mL solution comprising an initial metal ion concentration of more than 1 ppm by weight within about two hours.

2. The composition of claim 1 wherein the chitosan is crosslinked by treating with potassium persulfate at 60° C. and subsequent cooling to 4° C.

3. The composition of claim 1 wherein the solution further comprises more than 100 ppm total dissolved solids.

4. The composition of claim 1 further comprising a support structure of at least 10% by weight of the composition as a whole.

5. The composition of claim 1 wherein the metal ion is chosen from members selected from the group consisting of lead, selenium, mercury, cadmium, arsenic, copper, nickel and mixtures thereof.

6. The composition of claim 1 wherein the ligand is chosen from members selected from the group consisting of thioglycolic acid, terephthalic Acid, cysteine, cysteine hydrochloride, 3-mercaptopropionic acid, 4-mercaptobenzoic acid, mercaptoacetic acid, (3-mercaptopropyl)trimethoxysilane, (3-mercaptopropyl)triethoxysilane, Trichloro(3-chloropropyl)silane, 3,4-diamino benzoic acid, a 3,4-dihydroxybenzoic, 2-amino-5-hydroxy benzoic acid moiety, serine diacetic acid moiety, 3-nitro-4-amino benzoic acid moiety, threonine moiety, amino acids such as glycine, valine, leucine, serine moieties, phenylarsonic acid moiety, catechol and/or salicylic acid moiety, oxalic acid, other organic acids and mixtures thereof.

7. The composition of claim 1 wherein the solution is aqueous and of pH between about two and nine.

8. A composition of matter comprising:
   chitosan;
   support structure; and
   a ligand wherein the chitosan is more than about 25% by weight and wherein the chitosan is crosslinked between about 15% and 85% such that one gram of the composition is operable to adsorb more than 0.1 milli-gram of a metal per gram of the composition in a 250 mL solution with an initial metal concentration of more than about 1 ppm within about two hours.

9. The composition of claim 8 wherein the solution further comprises more than 100 ppm dissolved solids and the initial metal concentration comprises at least two metal ions selected from the group consisting of lead, selenium, mercury, cadmium, arsenic, copper and nickel.

10. The composition of claim 8 wherein said support structure comprises at least 10% by weight of the composition as a whole and is selected from the group consisting of alumina, titania, silica, zeolite, polyvinyl chloride, macroporous resin, microporous resin and mixtures thereof.

11. The composition of claim 8 wherein the solution is aqueous and of pH between about two and nine.

12. A composition of matter comprising:
   chitosan; and
   one or more ligands chosen from members selected from the group consisting of thioglycolic acid, terephthalic acid, cysteine and cysteine hydrochloride; wherein the chitosan is between about 20% and 90% by weight after drying and the ligands are more than about 2% by weight and the chitosan is crosslinked between about 15% and 85% such that one gram of the composition is operable to adsorb more than 0.1 milli-gram of a metal per gram of the composition in a 250 mL aqueous solution of pH between about two and nine with an initial metal concentration of more than 1 ppm within about two hours.

* * * * *